US009283882B1

(12) United States Patent
Langner et al.

(10) Patent No.: US 9,283,882 B1
(45) Date of Patent: Mar. 15, 2016

(54) CONVERTIBLE FIGHTING VEHICLE

(71) Applicant: Armorworks Enterprises, LLC, Chandler, AZ (US)

(72) Inventors: Richard F. Langner, Scottsdale, AZ (US); Matthew Luster, Mesa, AZ (US); Valent Horvatich, Scottsdale, AZ (US); William J. Perciballi, Phoenix, AZ (US)

(73) Assignee: ArmorWorks Enterprises LLC, Chandler, AZ (US)

( * ) Notice: Subject to any disclaimer, the term of this patent is extended or adjusted under 35 U.S.C. 154(b) by 0 days.

(21) Appl. No.: 14/174,340

(22) Filed: Feb. 6, 2014

Related U.S. Application Data

(60) Provisional application No. 61/761,319, filed on Feb. 6, 2013.

(51) Int. Cl.
*B60P 3/14* (2006.01)
*F41H 7/04* (2006.01)
*F41H 5/04* (2006.01)
*B60P 3/42* (2006.01)
*A61G 3/00* (2006.01)

(52) U.S. Cl.
CPC . *B60P 3/14* (2013.01); *A61G 3/001* (2013.01); *B60P 3/42* (2013.01); *F41H 5/0428* (2013.01); *F41H 7/048* (2013.01)

(58) Field of Classification Search
CPC ........... F41H 7/00; F41H 7/042; F41H 7/044; F41H 7/046; F41H 7/048
USPC .......... 89/36.02, 929, 903, 36.08, 930, 36.13, 89/45; 296/193.04, 35.3; 180/89.1, 291
See application file for complete search history.

(56) References Cited

U.S. PATENT DOCUMENTS 4,037,516 A * 7/1977 Hart ...................... F16B 31/028 116/200
4,269,443 A * 5/1981 Farmer ...................... B60P 3/42 105/418
5,533,781 A * 7/1996 Williams ........... B62D 25/2072 296/204
5,573,300 A * 11/1996 Simmons .................. B60P 3/42 169/24
5,663,520 A * 9/1997 Ladika .................... F41H 5/226 296/187.07
7,104,581 B2 * 9/2006 Chernoff ................ G06Q 30/06 296/35.3
7,905,540 B2 3/2011 Kiley et al.
8,267,003 B1 * 9/2012 Lou ......................... F41H 5/013 89/36.08
2005/0066805 A1 * 3/2005 Park ...................... F41H 5/0435 89/36.02
2006/0005695 A1 * 1/2006 Honlinger ............ B62D 53/045 89/36.08
2007/0085252 A1 * 4/2007 Murayama ............. B60R 19/18 267/152
2008/0017426 A1 * 1/2008 Walters ................... B60F 3/003 180/89.1
2010/0102596 A1 * 4/2010 Chapman ................ A61G 3/00 296/193.03
2012/0000719 A1 1/2012 Leonard et al.
2012/0097019 A1 4/2012 Sherbeck et al.
2012/0180641 A1 7/2012 Chiappini Andrea et al.
2012/0181100 A1 * 7/2012 Halliday .................. B60K 5/00 180/291

* cited by examiner

*Primary Examiner* — Samir Abdosh
*Assistant Examiner* — John D. Cooper
(74) *Attorney, Agent, or Firm* — James L Farmer

(57) ABSTRACT

Designs and methods are provided for a convertible fighting vehicle. In one embodiment the vehicle includes a drivable chassis having a standardized bed with mounting surfaces and a suite of interface connections for utility coupling. A mission module is adapted to attach to the bed mounting surfaces and couple with the suite of interface connections, wherein the mission module is configured in one of several mission specific forms.

19 Claims, 6 Drawing Sheets

7
43
32
41
23
42
20

7
43
32

41
23
42
20

CONVERTIBLE FIGHTING VEHICLE

TECHNICAL FIELD

The technical field of the present invention generally relates to tactical and utilitarian military vehicles. Such vehicles may include for example infantry fighting vehicles ("IFV") such as the American M113 and Bradley built by BAE, Canada's Light Armoured Vehicle (LAV) series built by General Dynamics Land Systems, Germany's Marder and Puma IFWs, the Chinese ZBD-97, the Soviet/Russian BMP-3, the Indian Abhay IFV, the Yugoslavian BVP M-80, the British Warrior, the Spanish Pizarro/ASCOD, the Italian Dardo, the South African Ratel, the French AMX-10P and VBCI, the Swedish Combat Vehicle 90, and the Dutch YPR-765 AIFV. The technical field may further include various trucks, troop carrying vehicles, High Mobility Multipurpose Wheeled Vehicles (HMMWV), ambulances, and other utilitarian vehicles that are suitable for, or presently in military service.

DESCRIPTION OF THE EMBODIMENTS

The instant invention is described more fully hereinafter with reference to the accompanying drawings and/or photographs, in which one or more exemplary embodiments of the invention are shown. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Figure 1:
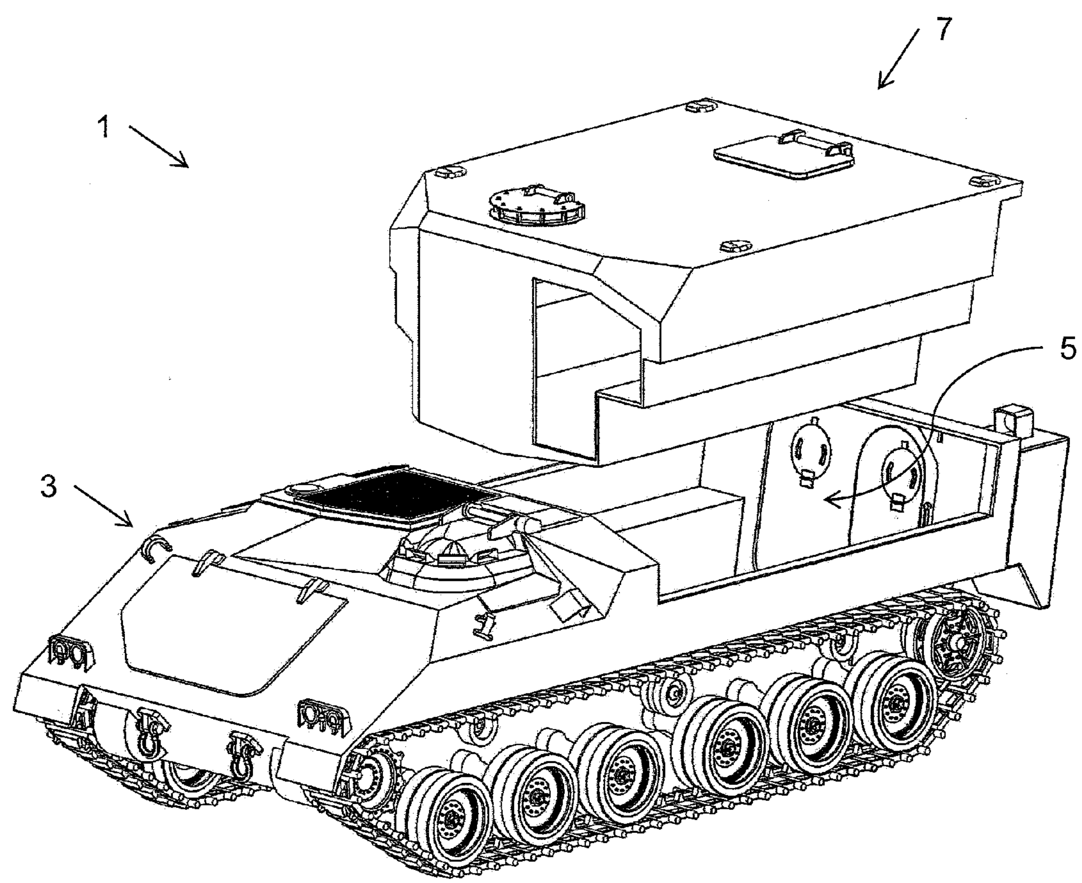
FIG. 1 is an exploded perspective of a convertible fighting vehicle in accordance with the present disclosure.

Referring now to the drawing Figures, a first embodiment of an exemplary convertible fighting vehicle is illustrated, and indicated generally at reference numeral 1. As best seen in FIG. 1, the convertible vehicle 1 comprises a chassis 3 with a standardized bed 5 adapted to receive a mission module 7. The chassis 3 is fully drivable by itself, and thus includes such equipment as a motor, drive train, fuel tanks, driver station, and necessary physical and electronic controls. In that regard the chassis 3 may be a modified version of an existing vehicle, or an original build from the ground up.

Figure 2:
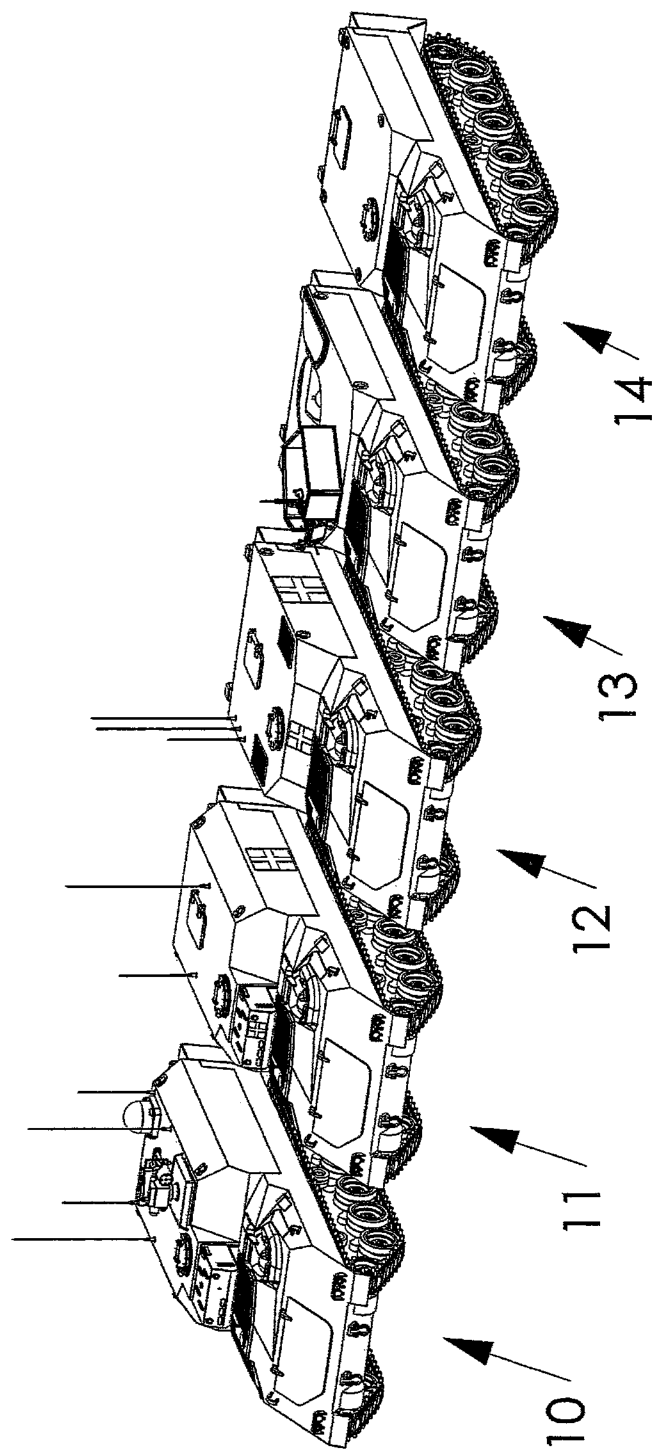
FIG. 2 is a perspective view of multiple embodiments of the convertible vehicle based on one chassis configuration supporting various different module embodiments.

The mission module 7 may be any of various mission specific configurations, each variation being mountable to the standard bed 5 of chassis 3. Referring to FIG. 2, the mission specific configurations may include for example: mission command 10, medical treatment 11, medical evaluation 12, mortar carrier 13, and general purpose 14, to name a few. Other configurations depending upon the type of base vehicle and mission needs are certainly foreseeable and contemplated within the scope of the present disclosure.

Figure 3:
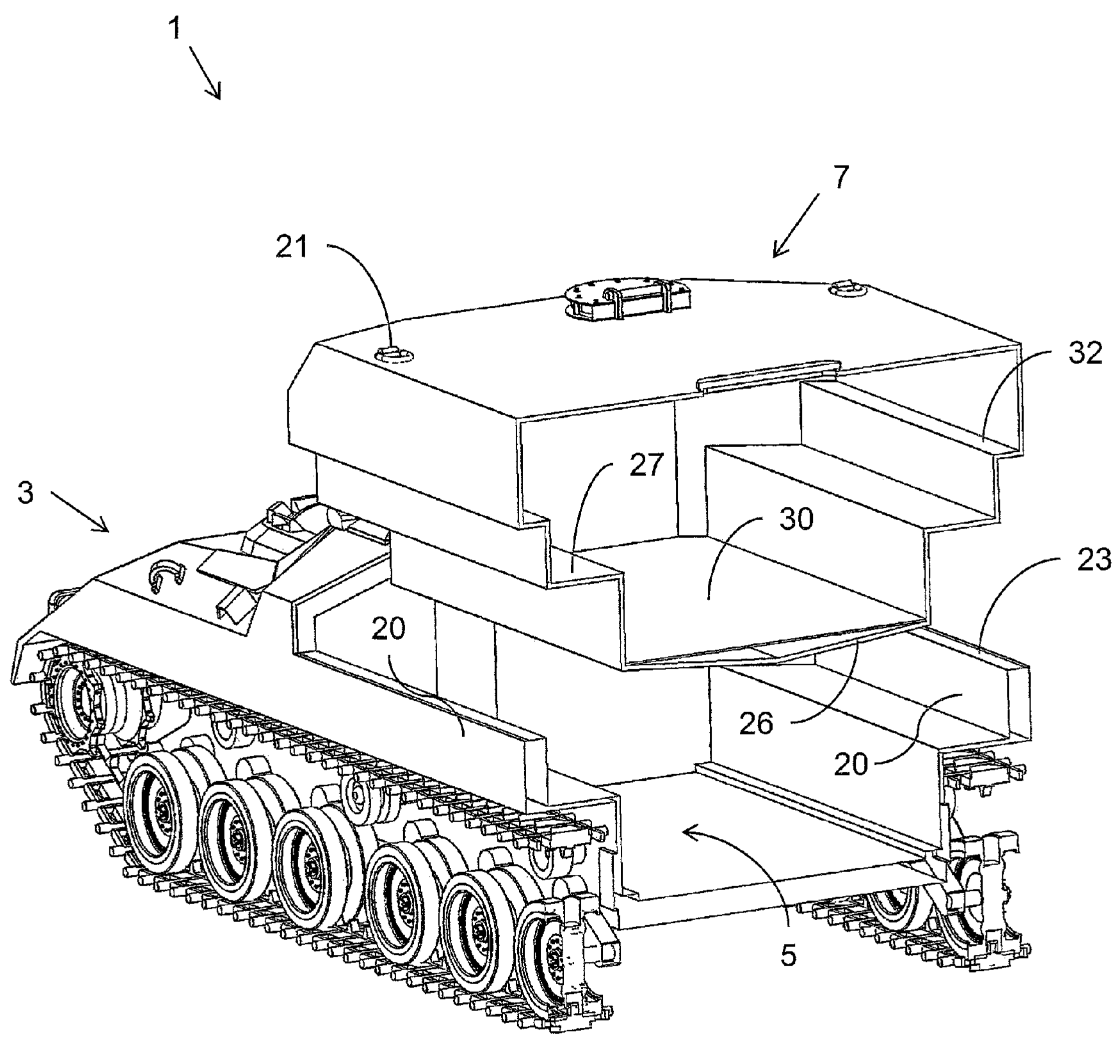
FIG. 3 is a cutaway view of the convertible vehicle of FIG. 1 showing an exemplary hull construction.
Figure 4:
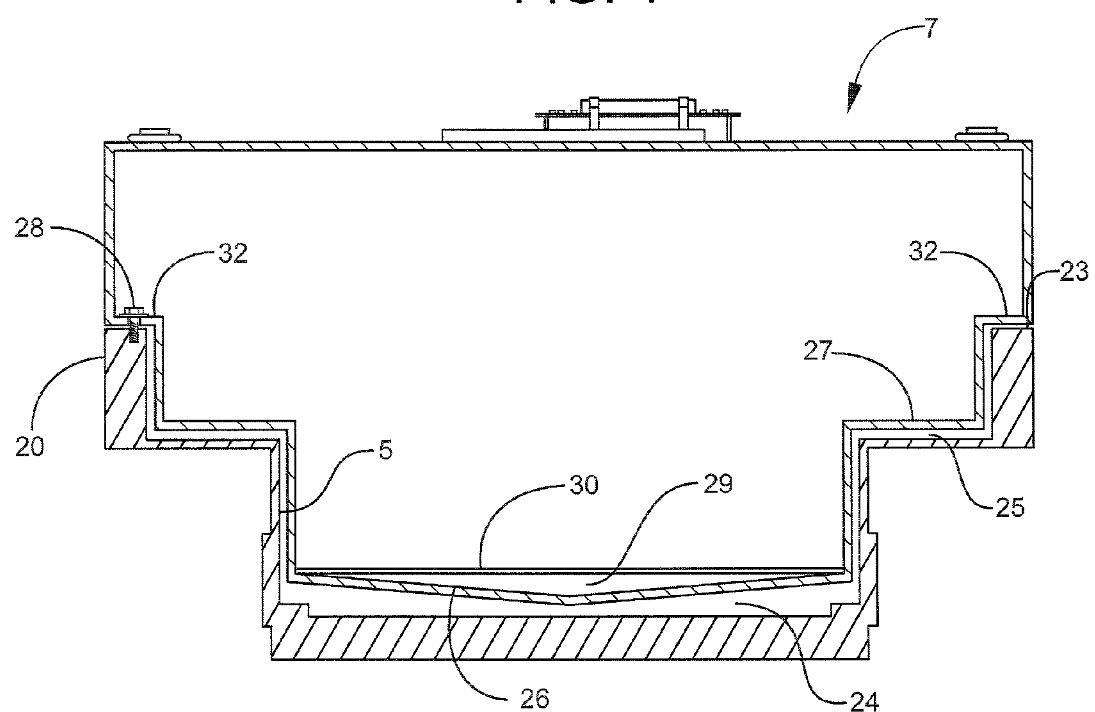
FIG. 4 is a cross section showing a module mounted to a chassis and attached with bolts.

FIGS. 3 and 4 depict an exemplary drop-in configuration where the mission module 7 nests within the side walls 20 of chassis bed 5 as shown. In this configuration the mission module may be installed by simply lowering the module into place using a suitable crane or hoist via lift rings 21 at the top corners of the module. Once in place, the module may be supported along the sides, for example, by a flat mounting surface 32 of the module supported on the top surface 23 of chassis walls 20. The mounting may be configured to create substantial gaps between the bed of the chassis and the bottom of the module, such as gaps 24 and 25 under the module bottom hull panel 26 and horizontal seating platforms 27. The gaps 24, 25 serve to at least initially decouple the bottom of the module from the high energy pressure wave associated with an under-vehicle mine or IED blast. The module bottom hull panel 26 may have a "V" shape as shown to provide an additional cavity 29 between the hull and a module floor 30. Cavity 29 as well as gaps 24 and 25 may be empty, or alternatively, filled with a honeycomb, foam, or other suitable energy-absorbing ("EA") material.

The mission module and chassis may be equipped with a standardized suite of interface connections for coupling electrical, hydraulic, and HVAC systems. The interface connections may be of a quick connect design, sealed both environmentally and ballistically, and accessible after the module is in place. The inside of the mission module may include additional functionality, such as for example a rear ramp release and fuel shut-off, as well as certain mission specific features associated with the various mission modules. Example mission specific features may include crew seating, navigation and communication equipment, weapon system controls and displays, health monitoring devices, and/or equipment stowage provisions.

The mission module may be secured to the chassis with blast resistant mounting bolts 28 that extend through the module mounting surface 32 and into the top surface 23 of side walls 20. Preferably the mounting interface is configured such that the bolts can be installed and removed blind from inside the mission module. The mounting bolts may be made of a relatively ductile, energy absorbing material. In one particular embodiment the bolts 28 are stainless steel fasteners of the type disclosed in U.S. Pat. No. 8,267,003, owned by the assignee of the present disclosure, the entire contents of which are hereby incorporated by reference.

Figure 5:
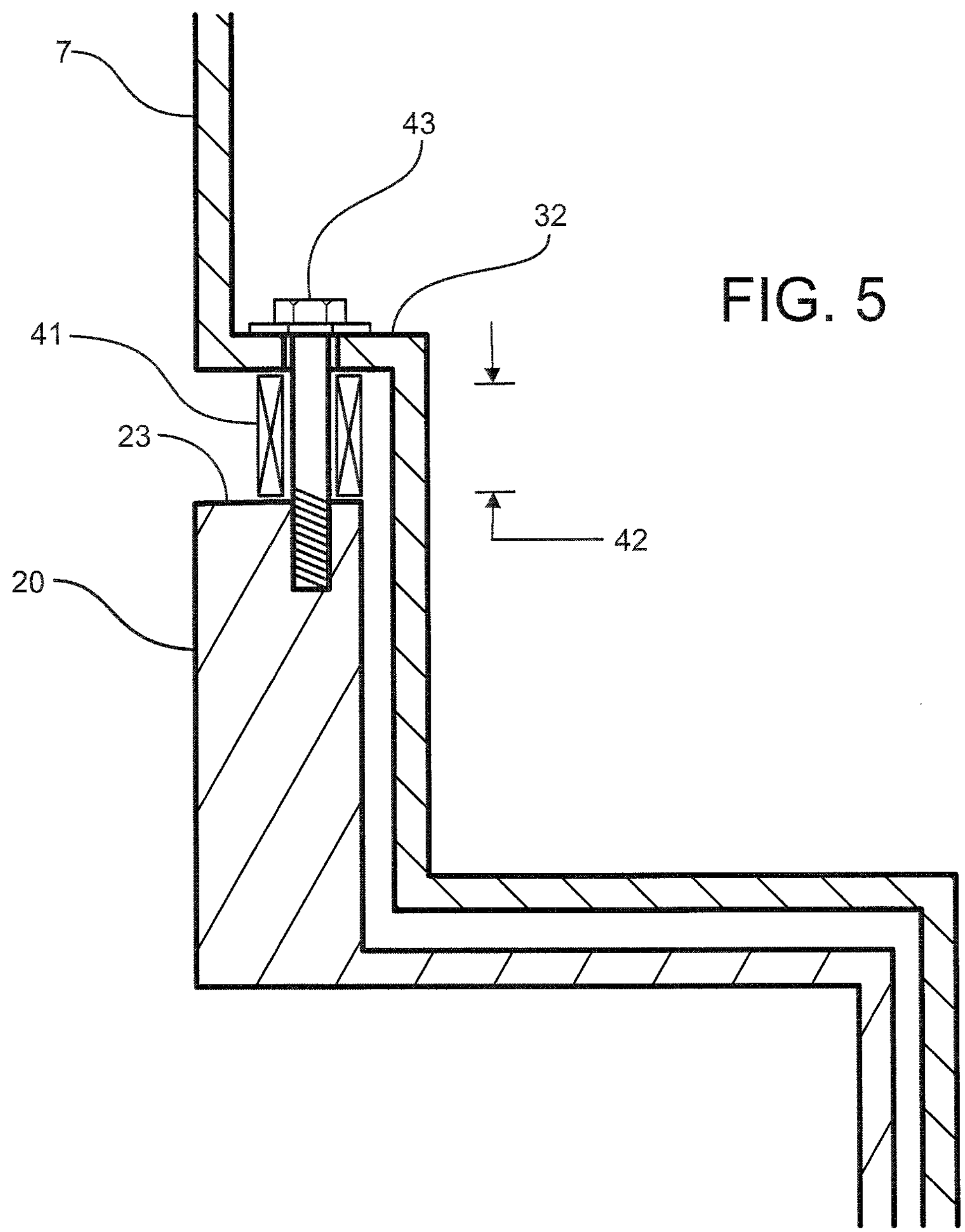
FIG. 5 is a cross section of an energy absorbing type module mounting embodiment.

In addition to energy absorbing bolts, the mounting interface may further incorporate energy absorbing (EA) devices to further isolate and protect the mission module and crew. FIG. 5 depicts one such embodiment wherein rather than bolting the module directly to the chassis, the module is supported by an EA mounting system 41. The normally rigid EA system 41 is designed to deform in a predictable manner during a blast event, absorbing energy as the gap 42 between the module and chassis closes. The EA system may comprise for example any of various types of deformable, bendable, or crushable members. In one particular embodiment the EA system comprises a series of crushable EA links such as those disclosed in U.S. Pat. No. 7,938,485 and D657,312, as well as pending U.S. patent application Ser. Nos. 12/965,021, 13/274,559, and 13/187,701, all of which are assigned to the assignee of the present disclosure, and all hereby incorporated by reference.

The EA type mounting interface may further include capture bolts to prevent the module from ever separating from the chassis. For example in the depicted embodiment, capture bolts 43 extend through the module mounting surface 32 and EA system 41, and attach to top surface 23 of the chassis side walls 20. The module mounting surface 32 is thus trapped under the bolt head. During a blast event, the mission module is free to move toward the chassis unrestrained by the capture bolts as the EA system crushes. However should the module try to separate from the chassis, such as during the rebound immediately following a blast impact, the bolts will prevent that and keep the module attached to the chassis. Like the mounting bolts, the capture bolts may also be made of a relatively ductile, or high energy absorbing material such as stainless steel.

The module hull and/or structure may be metallic or non-metallic and may also be reinforced with anti-ballistic armor plating. Depending upon the type of base vehicle and the anticipated mission or threat, the armor plating may cover the entire module hull structure, or less than the entire structure. For example, in the case of a relatively large and heavily armored base vehicle such as the Bradley, it may be sufficient to provide armor plating only on the exposed surfaces of the module, such as the upper sides and top, relying on the chassis to shield the nested bottom portion of the module. On the other hand, for lighter, less heavily armored base vehicles such as a truck or HMMWV, the armor plating may be extended to cover the bottom surfaces of the module as well.

The particular type of armor plating used may also vary with the type of base vehicle and mission, and with location on the module. For example, armor plating on the sides and top of the module may be designed to primarily protect against high velocity projectiles such as armor piercing rifle bullets. Such anti-ballistic armor plating is well known, and may simply comprise thick armor grade steel plates, or alternatively a composite structure made from ceramic tiles over a ballistic fabric backing panel where weight is more of a concern.

For the bottom surfaces of the module it may be desirable to use armor plating that is tailored to protect against under-vehicle mine blast effects more so than fired projectiles. Such blast resistant armor may be used exclusively, or in combination with the designed-in gaps and energy attenuating materials discussed above. Examples of suitable blast resistant panels specifically designed to spread out and attenuate the impact loads associated with an under-vehicle blast event are disclosed in pending U.S. patent application Ser. No. 13/172,754 entitled "Lightweight Impact Absorbing Armor Panel", assigned to the assignee of the present disclosure, and hereby incorporated by reference. In addition, blast resistant panels may be attached to the vehicle hull using a blast resistant mounting system designed to prevent the panels from detaching during or after a blast event. Examples of suitable blast resistant panel mounting systems are disclosed U.S. Pat. No. 8,267,003, also hereby incorporated by reference.

Figure 6:
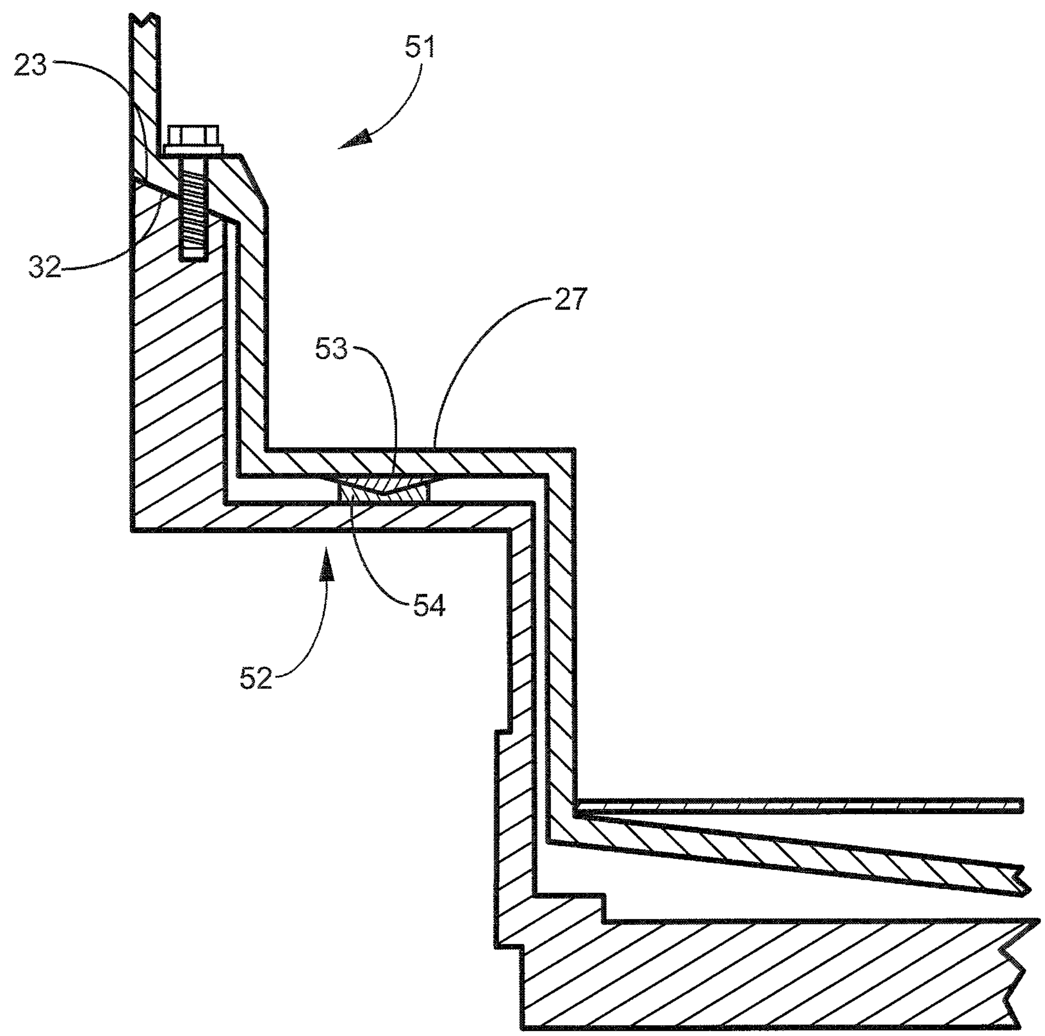
FIG. 6 is a cross section showing features for self centering of the module to the chassis.

FIG. 6 illustrates two possible embodiments for self centering the module with respect to the chassis bed. Proper centering and alignment ensures that the above described gaps between the module and chassis are even, as well as facilitating installation of mounting fasteners, and connection of accessories. In one embodiment indicated at reference arrow 51, top surface 23 of the chassis wall, and mounting surface 32 of the module are both inclined at an inward angle as shown, rather than flat and horizontal as implied in the previous drawings. In another embodiment indicated at reference arrow 52, the module and chassis incorporate mating "v" or cone-shaped piloting features in the gap space under the seating platforms 27. The depicted embodiment comprises a downward facing cone-shaped pilot feature 53 attached to or integral with the module, and received in a matching cone-shaped recess 54 attached to or integral with the chassis. Either embodiment may be used to center or properly align the module with respect to the chassis bed, both from side-to-side and also from front-to-back.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under §112, 6th paragraph is not intended. Additionally, it is not intended that the scope of patent protection afforded the present invention be defined by reading into any claim a limitation found herein that does not explicitly appear in the claim itself.

What is claimed is:

1. A convertible fighting vehicle, comprising:

a drivable chassis having a cab, a drive train, and a bed with mounting surfaces and a suite of interface connections for utility coupling;

a mission module adapted to fit on the bed and attach to the bed mounting surfaces, and couple with the suite of interface connections, wherein the mission module is configured in one of several mission specific forms;

an energy absorbing mounting system consisting of energy absorbing bendable members disposed in a gap between the mission module and the mounting surfaces of the bed, wherein the energy absorbing bendable members are normally rigid, and configured to absorb energy by deforming in a predictable manner during an initial stroke wherein the gap between the mission module and the mounting surfaces of the bed closes in response to a shock load produced by an under-vehicle explosion; and a series of mounting bolts extending from the mission module to the mounting surfaces of the bed through the gap there-between and attaching the mission module to the bed, wherein one of the mission module or the chassis bed is unrestrained by the mounting bolts from sliding along the bolts in a first direction toward the other of the mission module and the chassis bed during the initial stroke.

2. The convertible fighting vehicle of claim 1, wherein the one of the mission module or chassis bed is prevented by an end feature of the mounting bolts from escaping the mounting bolts in a second direction opposite the first direction in the event of a rebound immediately following the initial stroke, in which the mission module and chassis bed move away from one another.

3. The convertible fighting vehicle of claim 2, wherein the end feature of the mounting bolts comprises a bolt head.

4. The convertible fighting vehicle of claim 3, wherein the mounting bolts extend through holes in the mission module, and securely thread into to the chassis bed.

5. The convertible fighting vehicle of claim 1, wherein the drivable chassis comprises a tracked military fighting vehicle.

6. The convertible fighting vehicle of claim 1, wherein the bed of the chassis has sidewalls, and the mounting surfaces comprise top surfaces of the sidewalls.

7. The convertible fighting vehicle of claim 6, wherein a substantial gap exists between a bottom hull portion of the module and a top surface of the bed of the chassis when the module is supported on the mounting surfaces.

8. The convertible fighting vehicle of claim 7, further comprising an energy absorbing material filling the gap between the bottom hull portion of the module and the top surface of the bed of the chassis.

9. The convertible fighting vehicle of claim 7, wherein the bottom hull portion of the module comprises a blast resistant armor panel adapted to absorb and spread the impact force of an explosive blast.

10. The convertible fighting vehicle of claim 1, wherein the interface connections are accessible from inside the mission module.

11. The convertible fighting vehicle of claim 1, further comprising ballistic armor plating on exposed surfaces of the mission module.

12. The convertible fighting vehicle of claim 11, wherein the armor plating comprises a composite structure made from ceramic tiles over a ballistic fabric backing panel.

13. The convertible fighting vehicle of claim 1, wherein the mounting bolts are made of stainless steel.

14. The convertible fighting vehicle of claim 1, wherein the mounting bolts extend through the energy absorbing mounting system.

15. The convertible fighting vehicle of claim 1, wherein the inside of the mission module may include features selected from the group comprising a rear ramp release, a fuel shut-off, crew seating, navigation equipment, communication equipment, weapon system controls, weapon system displays, health monitoring devices, and equipment stowage provisions.

16. A convertible fighting vehicle, comprising:

a drivable chassis having a cab, a drive train, and a bed with mounting surfaces and a suite of interface connections for utility coupling;

a mission module adapted to attach to the bed mounting surfaces and couple with the suite of interface connections, wherein the mission module may comprise a mission command module, a medical treatment module, a medical evaluation module, a mortar carrier module, or a general purpose module; and an energy absorbing mounting system comprising energy absorbing bendable members disposed in a gap between the mission module and the mounting surfaces of the bed, wherein the energy absorbing bendable members are normally rigid, and configured to absorb energy by deforming in a predictable manner during an initial stroke as the gap between the mission module and the mounting surfaces of the bed closes in response to a shock load produced by an under-vehicle explosion; and a series of vertically oriented capture bolts extending from the mission module to the mounting surfaces of the bed through the gap there-between and attaching the mission module to the bed.

17. The convertible fighting vehicle of claim 16, wherein one of the mission module or the chassis bed is unrestrained by the capture bolts from sliding along the capture bolts in a first direction toward the other of the mission module and the chassis bed during the initial stroke, and wherein the one of the mission module or chassis bed is prevented by an end feature of the capture bolts from escaping the capture bolts in a second direction opposite the first direction in the event of a rebound immediately following the initial stroke in which the mission module and chassis bed move away from one another.

18. The convertible fighting vehicle of claim 17, wherein a substantial gap exists between a bottom hull portion of the module and a top surface of the bed of the chassis when the module is supported on the mounting surfaces.

19. The convertible fighting vehicle of claim 16, wherein the interface connections are accessible from inside the mission module.

* * * * *